July 5, 1955 R. W. BECKWITH 2,712,600

FREQUENCY RESPONSE CIRCUITS

Filed Dec. 18, 1950

Inventor:
Robert W. Beckwith, by Merton D. Moore
His Attorney.

United States Patent Office 2,712,600

Patented July 5, 1955

2,712,600

FREQUENCY RESPONSE CIRCUITS

Robert W. Beckwith, North Syracuse, N. Y., assignor to General Electric Company, a corporation of New York Application December 18, 1950, Serial No. 201,413

6 Claims. (Cl. 250—27)

Figure 1:
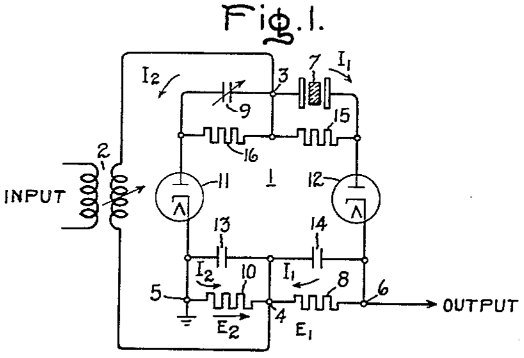

My invention relates to frequency response circuits, and particularly to circuits for the selection of closely spaced frequencies, such as may be used, for example, in a frequency-shift communication system.

For the transmission of intelligence, or for telemetering or pilot relaying by carrier currents over wire lines, it is often advantageous to use frequency shift keying in which a carrier wave is shifted back and forth between two different frequencies in accordance with the intelligence or code being transmitted. In wide band systems being currently employed, difficulty has been experienced, due to the effect of interfering noise which normally has substantial level in carrier current systems. Also, in certain power systems, such great use is made of carrier current over power lines that frequency congestion is a serious problem. Thus, the need for a narrow band frequency shift system is apparent.

The frequency response circuits disclosed in U. S. Patent 2,461,956, assigned to assignee of the present invention, go a considerable way in overcoming the above-mentioned problems. In actual practice in which the frequency response circuits of the aforementioned patent were used, it has been found that a much narrower band width and frequency spacing can be satisfactorily employed for remote telemetering over power lines, with an improvement in signal to noise ratio of as high as 25 db and an increase by as much as 20 times in the number of individual channels that may be placed in a given frequency spectrum, if the frequency selection circuits are given the proper characteristics in accordance with the teachings of the foregoing patent.

A circuit disclosed in the aforementioned patent for overcoming the above-mentioned problems comprises a capacitive bridge network utilizing a piezo-electric element for discriminating between high frequency signals whose frequencies are relatively close together. The first arm of one branch of the frequency discriminating circuit includes a piezo-electric element connected in series with a rectifier element. A resistance is connected in parallel with the piezo-electric element to provide a unidirectional current return path for currents flowing through the rectifier element. A second arm of the same branch of the discriminating circuit includes a capacitor arranged in parallel across a resistor. The first arm of the other branch of the frequency discriminating circuit adjacent the first arm of the first branch includes a capacitor connected in series wtih a second rectifier element. A resistor is connected in parallel across the capacitor to provide a unidirectional current return path for the second rectifier element. The second arm of the second branch of the frequency discriminating circuit includes a capacitor arranged in parallel across a resistor.

The aforementioned piezo-electric element has the characteristic that it acts like a series resonant circuit at one of the above frequencies mentioned in connection with a frequency shift keying system and acts like a parallel resonant circuit at the other of the above-mentioned frequencies. These frequencies can be made quite close, and, in fact, the inherent nature of the commonly used piezo-electric material, quartz, causes these frequencies to fall very close to each other, for example, 0.1% spacing in frequency. Above and below these two frequencies, the piezo-electric elements act like a capacitor. The capacitor in the first arm of the other branch of the circuit is made substantially equal to the value of capacitance presented by the piezo-electric element below and above the region of the aforementioned resonant frequencies. Accordingly, when a signal having a frequency different from the aforementioned frequencies is applied between the upper and lower terminals of the bridge circuit across which the aforementioned branches are connected, the unidirectional voltages developed across the respective second arms in the bridge are equal since the bridge is in balance and the output taken between the other terminals of the bridge circuit is substantially zero.

However, if a signal having a frequency corresponding to the series resonant frequency of the piezo-electric element, for example, is applied to the bridge network, the unidirectional voltage developed across the lower arm of the branch of the bridge circuit including the piezo-electric element is substantially greater than the voltage developed across the lower arm of the other branch since the impedance presented by the crystal is substantially reduced and, hence, a net rectified output appears across the output terminals of the bridge network. The converse is true when a signal having a frequency corresponding to the parallel resonant frequency of the piezo-electric element is applied. Since the impedance of the crystal at this frequency is very high, a rectified output reduced in magnitude is produced in the lower arm of the crystal branch and, accordingly, a net rectified output reversed in polarity is obtained from bridge network.

Thus, it is seen that the above-described circuit has the characteristic that at one frequency it develops an output of one polarity and at a slightly different frequency it develops an output of the opposite polarity and that a signal having a frequency either above or below the region defined by the aforementioned two frequencies the circuit produces substantially zero output.

In a circuit of the above character, it would be expected that if signals of two different frequencies were applied simultaneously to the circuit, one frequency, for example, corresponding to the series resonant frequency of the piezo-electric element and the other frequency appreciably different from this frequency and beyond the above-referred to region of frequencies, that the circuit would respond to produce an output corresponding to the signal having the series resonant frequency and producing substantially no output corresponding to the other frequency. However, it has been found in actual practice that when two frequencies of this kind are applied to the aforementioned bridge network circuit, the response of the circuit to the signal having the series resonant frequency is seriously and significantly impaired. Accordingly, the present invention is directed to overcoming the above limitation in the above-described frequency response circuit as well as to providing substantially greater output and improved efficiency and other improvements in frequency response circuits of the above character.

An object of my invention is to provide improved frequency response circuits which are particularly adapted for use in a frequency shift system for carrier current telemetering over power lines.

Another object of my invention is to provide an improved frequency discriminator which is sharply selective, thereby permitting closer frequency spacing between adjacent channels and also providing substantial improvement in reliability under adverse noise conditions or interfering signals.

A further object of my invention is to provide improved frequency selection circuits which function as a frequency filter as well as a frequency discriminator.

A still further object of my invention is to provide improvements in a frequency discriminator circuit whereby the input signal is efficiently converted into a corresponding unidirectional signal.

A general object of my invention is to provide improved crystal discriminator circuits.

Figure 2:
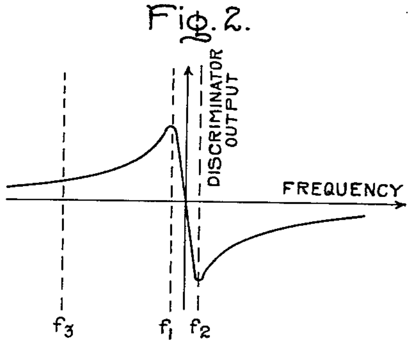
Figure 3A:
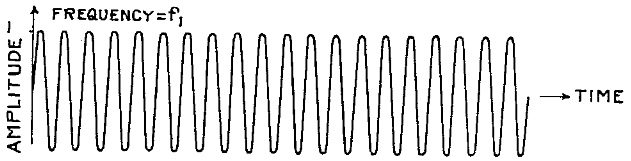
Figure 3B:
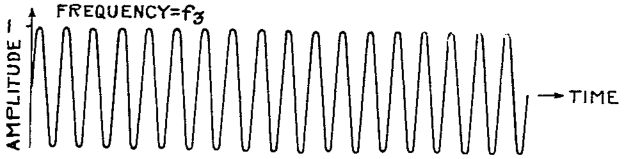
Figure 3C:
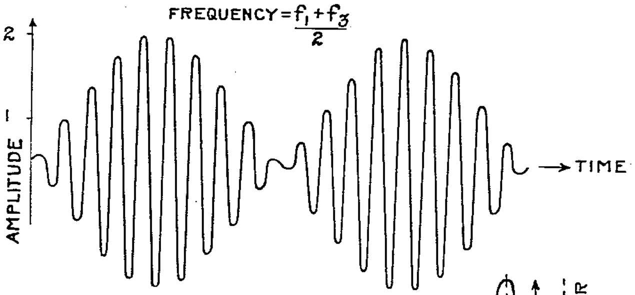
Figure 4:
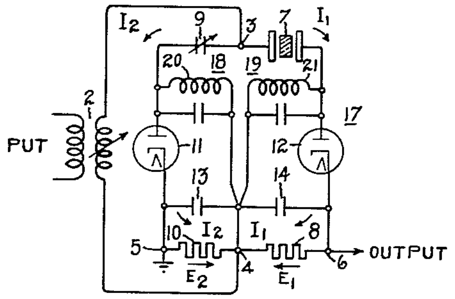
Figure 5:
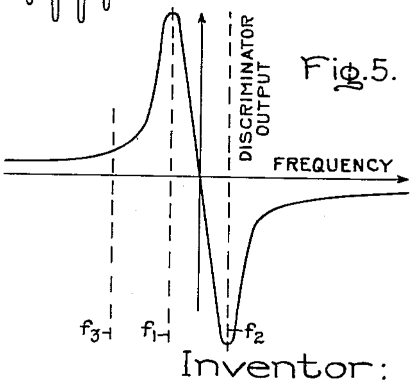

The features of my invention which I believe to be novel are set forth with particularity in the appended claims. My invention itself, however, together with further objects and advantages thereof, may best be understood by reference to the following description taken in connection with the accompanying drawings, in which Fig. 1 is a circuit diagram of a crystal discriminator of the kind disclosed in the above-mentioned patent; Fig. 2 is a graphical representation illustrating the output vs. frequency characteristics of the circuits of Fig. 1; Figs. 3*a*, 3*b*, and 3*c* are wave forms useful in explaining the operation of my invention; Fig. 4 is a circuit diagram of a crystal discriminator embodying the principles of my invention; Fig. 5 is a graphical representation illustrating the output vs. frequency characteristics of the circuits of Fig. 4.

The crystal discriminator 1, shown in Fig. 1, is of the kind disclosed and claimed in the aforementioned patent and comprises a four arm bridge network. Input signals are supplied through the transformer 2 through the diagonally opposite pair of input terminals 3 and 4 while the output is taken across terminals 5 and 6, one of which may be grounded, as shown. As indicated by the current vectors, $I_1$ and $I_2$, currents may flow from terminal 3 to terminal 4 through two parallel paths. The current $I_1$ flows through the piezo-electric device 7 and a load impedance indicated as a resistor 8, while the current $I_2$ flows through the variable capacitor 9 and a load impedance, indicated as a resistor 10. The circuit also includes unilateral conducting devices, represented as diode rectifiers 11 and 12, located in each of the parallel paths. These rectifiers are poled to permit current flow in the same direction, that is, from terminal 3 towards terminal 4. The resistors 8 and 10 are bypassed for the frequencies of the input signals by capacitors 13 and 14, as is conventional in diode detector circuits. Direct current return paths from the anodes of detectors 11 and 12 to ground are also provided by the resistors 15 and 16 in shunt to the crystal 7 and the variable capacitor 9, respectively.

It is well known in crystal theory that as the frequency applied to a crystal is raised from a frequency below the range in which it exhibits resonance phenomena, it first passes through a point at which it acts like a series resonant circuit and then through a point at which it acts like a parallel resonant circuit; the separation between these points is quite small. Advantage is taken of this phenomena, in the above circuits, by selecting the frequencies $f_1$ and $f_2$ corresponding to the two frequencies of the above-mentioned frequency shift keying system to correspond to the series and parallel resonant frequencies of the crystal element 7. As previously mentioned, the crystal looks like a substantially pure capacitance (considering the complete crystal assembly in the holder) at frequencies above and below this range.

With these facts in mind, it will be readily apparent how the crystal discriminator circuits of Fig. 1 are arranged and adjusted to produce the frequency characteristic shown in Fig. 2. The value of capacitor 9 is adjusted to balance the currents $I_1$ and $I_2$ flowing through the two parallel paths for frequencies outside the resonant range of the crystal. At the lower frequency $f_1$, the current $I_1$ flowing through the crystal exceeds the current $I_2$ flowing through the capacitor 9, due to the lower impedance of the crystal. Therefore, the resultant rectified potential $E_1$ exceeds the potential $E_2$, resulting in a positive potential at terminal 6 with respect to ground. The opposite is true at the higher frequency $f_2$, in which case the potential $E_1$ becomes much smaller than potential $E_2$, due to the relatively high impedance of the crystal. In practice, it is found that the inductance of the secondary of transformer 2, in which primary and secondary coils are loosely coupled, can be adjusted so as to equalize the voltage magnitudes at $f_1$ and $f_2$. The value of inductance required is approximately that needed for resonance with capacitor 9.

The curve of Fig. 2 represents the response of the circuit of Fig. 1 when signals of a single frequency are applied to the circuit. When two signals of substantially equal amplitude are applied to the circuit of Fig. 1, one of the frequencies corresponding to one of the two frequencies at which the circuit develops an output and the other frequency $f_3$ corresponding to a frequency at which the discriminator would develop substantially zero output if applied alone, it would be expected that the output developed by the discriminator for the frequency to which it is responsive would be unaffected by the frequency to which it is unresponsive. This is not generally true. In practice, it has been found that if two frequencies, one frequency $f_1$ corresponding to a frequency to which the discriminator is responsive and the other frequency $f_3$ corresponding to a frequency at which the discriminator produces substantially zero output when applied alone, are applied simultaneously to the circuit of Fig. 1 that the output developed by the signal of frequency $f_1$ is seriously and substantially reduced in magnitude. The reason for this particular response when two frequencies are simultaneously applied to the circuit of Fig. 1 will become apparent from the following considerations.

Assume that a signal of frequency $f_1$ having an amplitude of unity is applied to the discriminator circuit of Fig. 1. Since the impedance of the crystal at this frequency is substantially zero, the rectified output developed across resistance 8 in the crystal branch of the circuit may be designated by unity corresponding to the amplitude of the signal. Since the capacitor 9 has appreciable reactance at the frequency $f_1$, the output developed across resistance 10 is something less than unity and for the purpose of analysis and explanation may be taken as one-half. Accordingly, the net output between points 5 and 6 of the discriminator circuit is one-half at the frequency $f_1$.

If, now, a signal of frequency $f_3$ having an amplitude of unity and corresponding to a frequency beyond the resonant range of the crystal element 7 is applied to the circuit, an output corresponding to one-half is developed in each of resistors 10 and 8, since the reactance of the crystal element 7 now equals the reactance of the capacitor 9. Accordingly, the net output at this frequency is substantially equal to zero.

Assume, now, that a signal of frequency $f_1$ having an amplitude of unity is applied simultaneously with a signal of frequency $f_3$ having an amplitude of unity to the input terminals 3 and 4 of the circuit of Fig. 1. Then, in accordance with the preceding analysis, the unidirectional output developed across the resistance 8 is designated by 1½, the signal of frequency $f_1$ contributing unity and the signal of frequency $f_3$ contributing one-half. Since the impedances in the branch of the circuit not including the piezo-electric device are substantially constant over the frequencies under consideration, the response of this circuit to a signal corresponding to the sum of the two signals $f_1$ and $f_3$ may be used in the analysis. In Fig. 3*c* is shown the resultant signal obtained by adding the signals of Figs. 3*a* and 3*b* which correspond to signals of frequency $f_1$ and $f_3$, respectively. It should be noted that this signal has an average frequency which is one-half the sum of the component frequencies and whose amplitude varies from zero to two at a frequency rate equal to the difference in the two frequencies. It is apparent that when the signal of wave form shown in Fig. 3*c* is applied to the input of the discriminator that in order for the discriminator to develop the same output that is developed when the frequency $f_1$ alone is applied, the output developed across the resistance 10 must be one so that a net output of one-half can be obtained. In order for this to be true, the time constants of the networks comprising resistance 10 and capacitor 13, and resistance 16 and capacitor 9 must be long in comparison to the difference of the two frequencies $f_1$ and $f_3$. If these time constants are sort in comparison to the difference frequency of the two frequencies, the rectified output is no longer represented by one but by a value less than one. Accordingly, by making the time constants of the above-referred-to networks long in comparison to the difference frequency of frequency $f_1$ and frequency $f_3$, the interfering effect of the frequency $f_3$ on the frequency $f_1$ can be substantially eliminated.

While it is possible to make the time constant comprising resistance 10 and capacitor 13 large enough, it is not practical to make the time constant comprising resistance 16 and capacitor 9 large, since the value of capacitor 9 is limited by the value of the capacitance of the piezo-electric element 7. Accordingly, resistor 16 must be large. A high resistance 16 considerably reduces the output obtained across resistor 10. Thus, while it is practical to increase the time constant comprising resistor 10 and capacitor 13, it is not practical to increase the time constant comprising resistor 16 and capacitor 9.

In Fig. 4 is shown a discriminator circuit 17 by means of which the undesirable effects produced by the short time constant determined by resistor 16 and capacitor 9 is eliminated and at the same time providing improved performance and increased output for a signal input of given amplitude. Like numerals have been used to designate elements corresponding to the elements of Fig. 1. In the circuit of Fig. 4, the time constant comprising resistor 10 and capacitor 13 is made long, the resistance 16 of the circuit of Fig. 1 is eliminated and a means is provided which may take the form of a parallel resonant circuit 18, resonant at a frequency below the frequency of operation of the circuit, and which provides a direct current return path for the rectifier element 11. The parallel resonant circuit 18 is connected in shunt to the rectifier element 11 and the load impedance 10. The parallel resonant frequency of the parallel resonant circuit is a value below the frequency of operation of the circuit so that within the range of frequencies of operation of the circuit the parallel resonant circuit presents a capacity reactance comparable to the reactance of a capacitor 9 and providing a unidirectional current return path having substantially zero resistance. In order that both branches of the bridge circuit be in balance, the resistance 15 is eliminated and a similar parallel resonant circuit 19 is connected in shunt to the rectifier element 12 and the load impedance 8. The time constant comprising resistor 8 and capacitor 14 is also made long with respect to the above-mentioned difference frequency.

It is now apparent that the circuit of Fig. 4 provides a discriminater output which is unaffected by interfering signals adjacent to the signals of a frequency to which the discriminator is responsive and, accordingly, the discriminator circuit acts as a filter as well as a discriminator. It is further apparent that the interfering signals may be comparable amplitude and quite close to the desired frequency and still the circuit will respond as though no interfering frequency were present.

A particular advantage of eliminating the resistors 16 and 15 from the circuit of Fig. 1 is that greater output is obtained from the discriminator 17 since the rectified output is developed only across resistors 10 and 8. In this connection, it should be noted that the D. C. resistance of the inductive portions 20 and 21 of the parallel resonant circuits is quite small.

Preferably, the parallel resonant circuits 18 and 19 may comprise a coil having a parallel resonant frequency somewhat below the lowest frequency of operation of the circuit. In an actual circuit which is mentioned for purposes of illustration in which the capacitor 9 had a value of 20 micromicrofarads and in which the circuit was designed for operation around 131 kilocycles it was found that with an inductance having a very low D. C. resistance and having a parallel resonant frequency of about 50 kilocycles that very satisfactory operation was obtained and that the effect of interfering frequencies at 131 kilocycles was found to be substantially reduced over the effect of interfering frequencies in discriminator circuit of Fig. 1 for signals a few hundred cycles above and below 131 kilocycles. Increased output was obtained from the discriminator as well.

It is, thus, apparent that I provide simple and effective frequency selection circuits, particularly adapted to the requirements of a frequency shift, telemetering system in which the number of available frequency channels may be increased, at the same time providing greater freedom from interference due to cross talk between signalling channels. My circuits are also obviously adapted to use in a space radio system at the same or higher frequencies.

While I have shown particular embodiments of my invention and suggested certain modifications that may be made therein, it will of course, be understood that I do not wish to be limited thereto, since various other modifications will readily occur to those skilled in the art. I, therefore, contemplate by the appended claims to cover any such modifications as fall within the true spirit and scope of my invention.

What I claim as new and desire to secure by Letters Patent of the United States is:

1. In apparatus for discriminating between waves of two different frequencies, the combination of a pair of input terminals to which said waves are supplied, a pair of parallel paths between said terminals, each path including a rectifying device and a load impedance adapted to have unidirectional potentials developed thereon in response to said waves, each path also including in series with said rectifying devices and load impedance a current controlling element, one element being a piezo-electric crystal exhibiting series resonance and parallel resonance near said two frequencies respectively and substantially pure capacity reactance above and below said frequencies, the other element being a capacitor, each path including means connected in parallel with said rectifying device and said load impedance and having a high impedance at said frequencies and exhibiting a high impedance at a frequency below said frequencies and a lower impedance at other frequencies in the pass band thereof and presenting a low resistance for unidirectional currents, output means responsive to the difference between potentials developed across said load impedances, said capacitor being adjusted to impress minimum resultant output potential on said output means at frequencies for which said crystal exhibits substantially pure capacitive reactance.

2. In apparatus for discriminating between waves of different frequencies lying within a relatively narrow frequency band, a pair of input terminals for said waves, two parallel paths between said terminals, each path including a unilaterally conducting element and a load impedance adapted to have unidirectional potentials developed thereon in response to said waves, said elements being poled to permit current flow in the same direction between said terminals, one path further including in series with the unilaterally conducting element and load impedance of said one path a capacitance and the other path including in series with the unilaterally conducting element and load impedance of said other path a piezo-electric crystal, each path including means connected in parallel with said unilaterally conducting element and said load impedance and having a high capacitive reactance comparable to the reactance of said capacitance at said frequencies and a resistance for unidirectional currents inappreciable with respect to the resistance of said load impedance, said crystal exhibiting a relatively high impedance near one edge of said band and a relatively low impedance near the other edge of said band, means for adjusting said capacitance substantially to balance the currents through both paths at frequencies outside said band, and output means responsive to the difference betwen unidirectional potentials developed across said load impedances.

3. Apparatus responsive to signals having frequencies lying within a predetermined band comprising, in combination, a four-arm bridge network having a pair of diagonally opposite input terminals to which said signals are supplied, first and second arms adjacent one of said terminals each comprising a resistance in parallel with a capacitance of low impedance at said frequencies, third and fourth arms adjacent said other terminal, said third arm serially comprising a capacity element and said fourth arm serially comprising a piezo-electric element, said piezo-electric element being series-resonant near one edge of said band and parallel-resonant near the other edge of said band, a pair of unilateral conducting devices also serially included in said third and fourth arms respectively and poled to permit current flow in the same direction between said terminals, means exhibiting parallel resonance at a frequency below said frequencies and providing direct-current paths in shunt to each of said first and second arms and their adjacent unilaterally conducting devices, means for adjusting said capacity element substantially to balance the effective capacity of said piezo-electric element outside said band, and output means connected across said first and second arms.

4. Apparatus responsive to signals having frequencies lying within a predetermined band comprising, in combination, a four-arm bridge network having a pair of diagonally opposite input terminals to which said signals are supplied, first and second arms adjacent one of said terminals each comprising a resistance in parallel to a capacitance of low impedance at said frequencies, third and fourth arms adjacent said other terminal, said third arm serially comprising a capacity element and said fourth arm serially comprising a piezo-electric element, said piezo-electric element being series-resonant near one edge of said band and parallel-resonant near the other edge of said band, a pair of unilateral conducting devices also serially included in said third and fourth arms respectively and poled to permit current flow in the same direction between said terminals, a first parallel resonant circuit resonant at a frequency below said frequencies and having relatively low resistance for unidirectional currents providing a direct-current path in shunt to said first arm and its adjacent unilaterally conducting device, a second parallel resonant circuit resonant at a frequency below said frequencies and having relatively low resistance providing a direct-current path in shunt to said second arm and its adjacent unilaterally conducting device, means for adjusting said capacity element substantially to balance the effective capacity of said piezo-electric element outside said band, and output means connected across said first and second arms.

5. In apparatus for discriminating between waves of different frequencies lying within a relatively narrow frequency band, a pair of input terminals for said waves, two parallel paths between said terminals, each path serially including a unilaterally conducting element and a load impedance, a first coil having a parallel resonant frequency below said frequencies and having a relatively low resistance for unidirectional currents connected in shunt to one of said unilaterally conducting devices and its adjacent load impedance, a second coil having a parallel resonant frequency below said frequencies and having a relatively low resistance for unidirectional currents connected in shunt to the other of said unilaterally conducting devices and its adjacent load impedance, each of said impedances being shunted by a capacity of low reactance at said frequencies and adapted to have unidirectional potentials developed thereon in response to said waves, each path further serially including a current-controlling element, one element being a piezo-electric device resonating within said band and having substantially pure capacitance outside said band, the other element being a capacitance having a value substantially to balance the currents in said two paths for said frequencies outside said band, and a utilization circuit responsive to the difference in potentials on said load impedances.

6. In apparatus for discriminating between waves of two different frequencies, the combination of a pair of input terminals, inductive means connected in shunt with said terminals for applying said waves to said terminals, a pair of parallel current paths between said terminals, each path including a rectifying device and a load impedance adapted to have unidirectional potentials developed thereon in response to said waves, each path also serially including a current controlling element, one element being a piezo-electric crystal exhibiting series resonance and parallel resonance near said two frequencies respectively and substantially pure capacity reactance above and below said frequencies, the other element being a capacitor, each path including means connected in parallel with said rectifying device and said load impedance and having a high impedance at said frequencies and a low resistance for unidirectional currents, output means responsive to the difference between potentials developed across said load impedances, said capacitor being adjusted to impress minimum resultant output potential on said output means at frequencies for which said crystal exhibits substantially pure capacitive reactance, the inductance of said inductive means adjusted for resonance with said capacitor whereby outputs of substantially the same amplitude are developed in said output means at each of said frequencies.

References Cited in the file of this patent

UNITED STATES PATENTS

| | | |
|---|---|---|
| 2,338,526 | Maynard | Jan. 4, 1944 |
| 2,344,731 | Rankin | Mar. 21, 1944 |
| 2,461,956 | Beckwith | Feb. 15, 1949 |

FOREIGN PATENTS

| | | |
|---|---|---|
| 621,694 | Great Britain | Apr. 14, 1949 |